United States Patent
Colarossi et al.

(10) Patent No.: US 10,604,095 B2
(45) Date of Patent: Mar. 31, 2020

(54) SENSOR COMMUNICATION CONTROL CONSIDERING EMC COMPLIANCE FOR RESTRAINT CONTROL MODULE

(71) Applicant: Autoliv ASP, Inc., Ogden, UT (US)

(72) Inventors: Vincent Colarossi, Dearborn Heights, MI (US); Peter Kowalczyk, South Lyon, MI (US)

(73) Assignee: VEONEER US, INC., Southfield, MI (US)

( * ) Notice: Subject to any disclaimer, the term of this patent is extended or adjusted under 35 U.S.C. 154(b) by 58 days.

(21) Appl. No.: 15/940,547

(22) Filed: Mar. 29, 2018

(65) Prior Publication Data

US 2019/0305724 A1 Oct. 3, 2019

(51) Int. Cl.
*B60R 21/01* (2006.01)
*H04L 25/02* (2006.01)
*G06F 13/40* (2006.01)

(52) U.S. Cl.
CPC .......... *B60R 21/01* (2013.01); *G06F 13/4072* (2013.01); *H04L 25/0272* (2013.01); *B60R 2021/01054* (2013.01); *B60R 2021/01102* (2013.01)

(58) Field of Classification Search
CPC . H04L 2012/40273; H04L 2012/40208; H04L 25/0274; H04L 25/028; H04L 25/0272; H04J 3/0638; H04J 3/0652; B60R 2021/01068; B60R 2021/0104; B60R 2021/01054; B60R 2021/01102; B60R 21/01; G06F 13/4072; H04B 3/50
See application file for complete search history.

(56) References Cited

U.S. PATENT DOCUMENTS

| | | | | |
|---|---|---|---|---|
| 9,341,666 | B2 * | 5/2016 | Weiss | G01D 3/08 |
| 10,079,650 | B2 * | 9/2018 | Aichriedler | H04J 3/0638 |
| 2004/0124905 | A1 * | 7/2004 | Haase | H03K 5/151 |
| | | | | 327/437 |

OTHER PUBLICATIONS

Kinnaird, "Differential signaling best practices", Dec. 2012, Retrieved from www.ecnmag.com/article/2012/12/differential-signal-best-practices on Jul. 19, 2019 (Year: 2012).*

* cited by examiner

*Primary Examiner* — Ryan Johnson
(74) *Attorney, Agent, or Firm* — Dickinson Wright PLLC

(57) ABSTRACT

A restraint control module is configured to communicate a sync pulse to a sensor. The control module includes a first sync pulse driver and a second sync pulse driver. The first sync pulse driver is connected to a first signal line and the second sync pulse driver connected to a second signal line. The first and second sync pulse drivers being configured to generate a differential sync pulse signal across the first signal line and second signal line using a first signal on the first signal line and a second signal on the second signal line.

19 Claims, 5 Drawing Sheets

SENSOR COMMUNICATION CONTROL CONSIDERING EMC COMPLIANCE FOR RESTRAINT CONTROL MODULE

BACKGROUND

PSI5 interfaces have a signal called a Sync Pulse that synchronizes sensors on the communication bus. The Sync pulse is a relatively high level/high speed signal that generates unwanted EMC emissions from the sensor wires and causes the restraint module to fail OEM EMC tests.

BRIEF SUMMARY

A restraint control module is provided in this disclosure. The restraint control module is configured to communicate a sync pulse to a sensor. The control module includes a first sync pulse driver and a second sync pulse driver. The first sync pulse driver is connected to a first signal line and the second sync pulse driver connected to a second signal line. The first and second sync pulse drivers being configured to generate a differential sync pulse signal across the first signal line and second signal line using a first signal on the first signal line and a second signal on the second signal line.

DETAILED DESCRIPTION OF THE DRAWINGS AND THE PRESENTLY PREFERRED EMBODIMENTS

Figure 1:
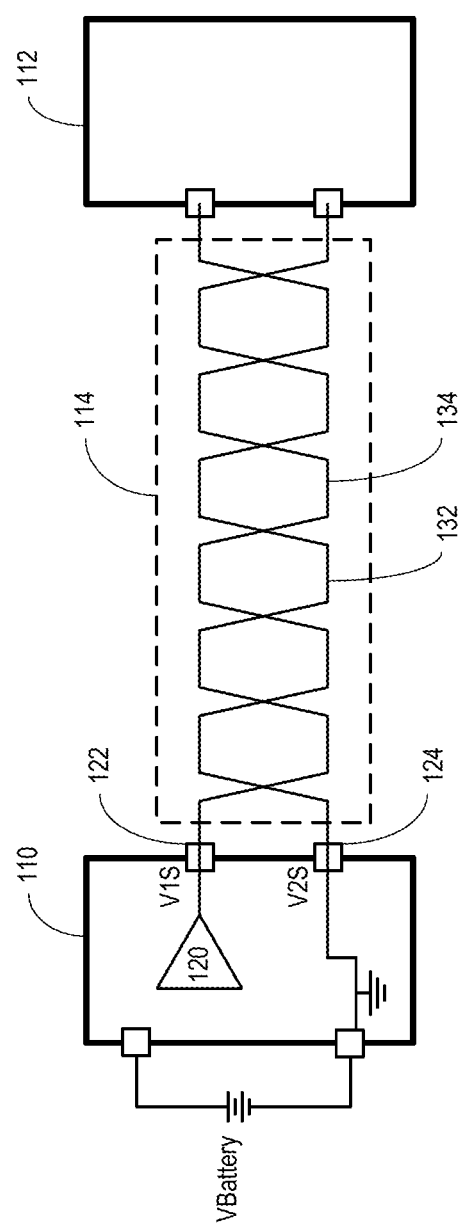
FIG. 1 is a schematic view of system including a controller in communication with a sensor.

The new proposed sensor communication control (Sync Pulse) is split up into two separated drivers. The drivers may be referred to as driver 1 and driver 2. The control of the drivers is to provide a direct current (DC) bias voltage and pulsed value consistent with the existing single-ended solution to be compatible with the existing sensors used in common vehicle restraint systems. However, the pulsed value is driven in a differential nature in order to reduce EMC emissions during the pulsed high voltage and high speed transitions of the communication waveform. Balanced output impedance, symmetrical rise and fall times in the drivers 1 and driver 2 and the twisted pair communication concept all work to attenuate EMC emissions with this new driver concept. The concept of DC biasing and pulsed amplitude are illustrated in the drawing provided with this disclosure. The reduction in EMC emissions has been measured at 15 dBuV. This new proposal will provide PSI5 timing compliance and Reduced EMC emissions.

FIG. 1 is a schematic view of a PSI5 compatible controller 110 in communication with a sensor 112 using the PSI5 communication protocol. The controller 110 communicates with the sensor 112 over a cable 114. The cable may include a twisted pair of conductors for example, wire 132 and wire 134. The sensor 112 may be a pressure sensor, accelerometer, moisture sensor, or other common automotive sensor. PSI5 compatible communication utilizes a sync signal that includes a pulse. In one implementation, the driver 120 may generate a pulse that is delivered to a first terminal 122 of the controller and communicated to the sensor 112 through a first wire 132. The pulse may be generated by the driver 120 relative to ground. Ground may be tied to terminal 124 and provided as a reference to the sensor through wire 134. Providing the signal in the manner through the twisted pair of wires 132, 134, electrical noise along the cable path may be minimized.

Figure 2:
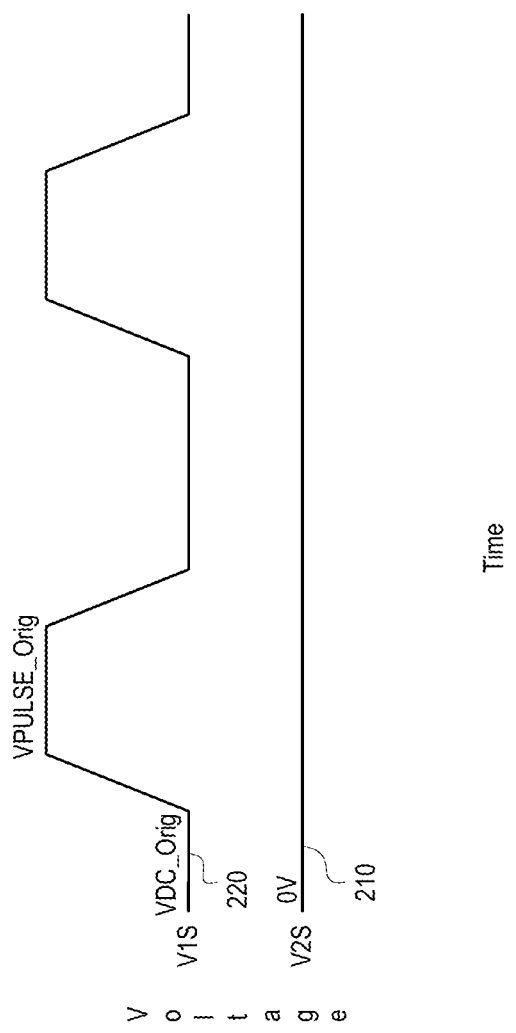
FIG. 2 is an illustration of the sync pulse signals provided by the controller of FIG. 1.

FIG. 2 is an illustration of the sync pulse signals provided by controller 110. The signal 210 may correspond to the electrical ground provided through wire 134 to the sensor 112. Signal 220 may correspond to the sync pulse generated by the driver 120 and provided to the sensor 112 through wire 132. The sync pulse 220 may be offset or include a DC bias from the electrical ground 210. This implementation may be susceptible to noise under certain conditions.

Figure 3:
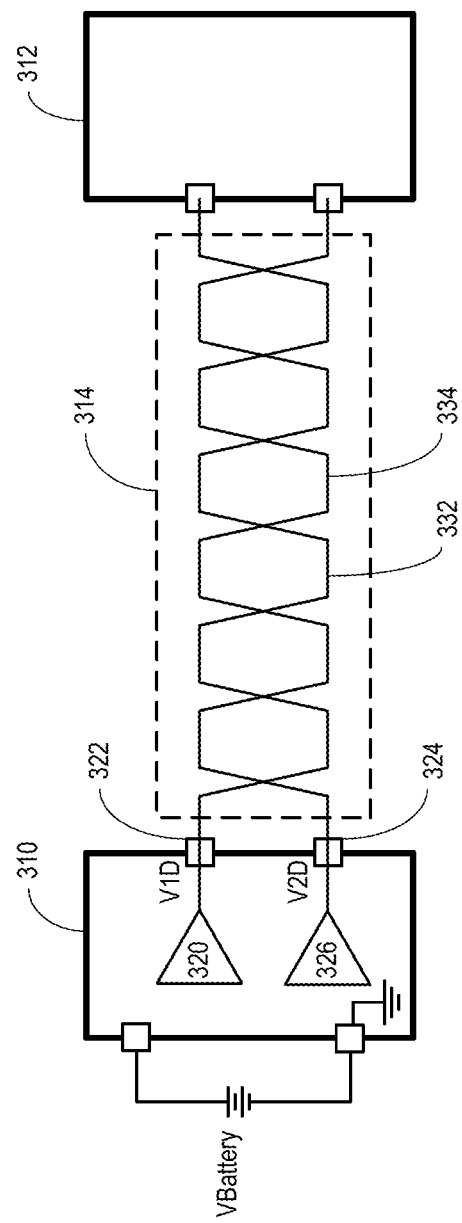
FIG. 3 is a schematic view of system including another controller in communication with a sensor.

FIG. 3 is a block diagram of another implementation of a sensor control system. Controller 310 may communicate with the sensor 312 using a PSI5 communication protocol. A cable 314 may be connected between the controller 310 and the sensor 312 to communicate signals from the controller 310 to the sensor 312. The cable 314 may include a twisted pair of wires. The first wire 332 and the second wire 334 may be a wire twisted pair. The first wire 332 and the second wire 334 may have a balanced output impedance.

The controller 310 may include a first driver 320 and a second driver 326. The first driver 320 and the second driver 326 may work together to generate two synchronized signals that when combined in super-position generate a PSI5 compatible with the sync pulse signal. As such, the driver 320 may generate a first signal provided to terminal 322 of the controller 310. The first signal may then travel from the controller 310 through wire 332 to the sensor 312. Similarly, the driver 326 may generate a second signal that is provided to terminal 324 of the controller 310. The second signal may then be communicated from the controller 310 to the sensor 312 through wire 334. Accordingly, the first driver 320 and the second driver 326 may operate together in a differential mode to generate a differential signal comprised of the first signal and second signal. The differential signal may have a DC bias or offset relative to an electrical ground and/or may float relative to ground.

Additionally, first signal may be symmetrical with the second signal. The first signal may have the same rise and/or fall times as the second signal. The first signal is has the opposite polarity as the second signal. The first signal has positive initial slope and negative second slope and the second signal has negative initial slope and positive second slope. The first signal and second signal sum to generate a combined pulse signal that matches PSI5 specifications.

Definitions below make the proposed differential signal yet provide same DC and Pulsed Values of a single ended drive system:

VDC_Orig is the expected low pulse voltage for the sync pulse signal 220 (V1S) of a single ended system. VDC_Orig may typically be between 5 to 11 V. VDC− is the high pulse voltage for the first signal 430 (V2D). VDC+ the low pulse voltage for the second signal 440 (V1D). VOFF is the offset voltage and may typically be between 0 to 100 mV. VPULSE_Orig is the expected high pulse voltage for the sync pulse signal 220 (V1S) of a single ended system. VPULSE_Orig may typically be between 4 to 5 V above the value for VDC_Orig. VPULSE− is the low pulse voltage for the first signal 430 (V2D). VPULSE+ the high pulse voltage for the second signal 440 (V1D).

Figure 4:
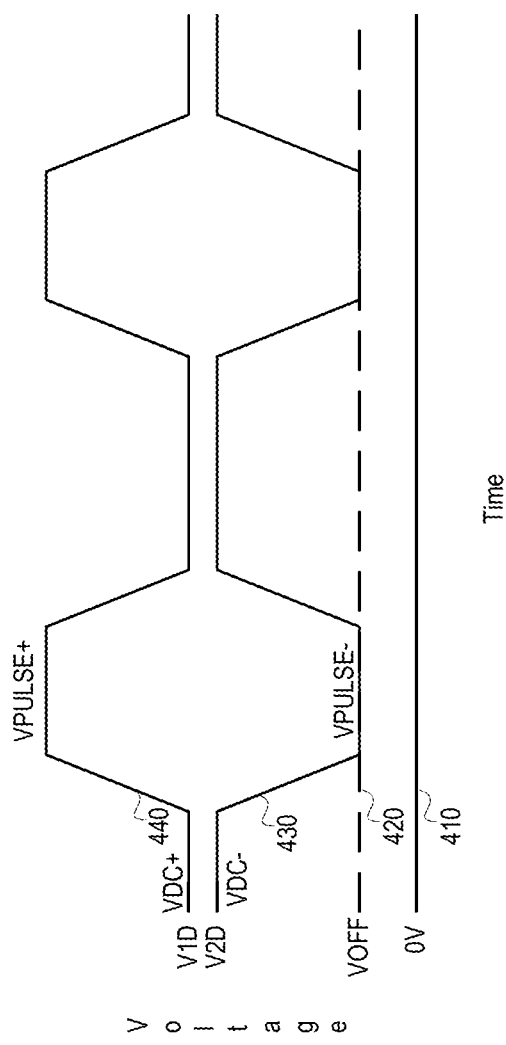
FIG. 4 is an illustration of the sync pulse signals provided by the controller of FIG. 3.

$VDC+ = (VPULSE\_Orig/2) + VDC\_Orig + VOFF$ $VDC- = (VPULSE\_Orig/2) + VOFF$ $VPULSE+ = (VDC+) + (VPULSE\_Orig/2)$ $VPULSE- = (VDC-) - (VPULSE\_Orig/2)$ Where VOFF>=0V $VDC+-VDC- = \{(VPULSE\_Orig/2) + VDC\_Orig + VOFF\} - \{(VPULSE\_Orig/2) + VOFF\}$ Therefore, VDC+−VDC−=VDC_Orig $VPULSE+-VPULSE- = \{((VPULSE\_Orig/2) + VDC\_Orig + VOFF) + (VPULSE\_Orig/2)\} - \{((VPULSE\_Orig/2) + VOFF-) - (VPULSE\_Orig/2)\}$ Therefore, VPULSE+−VPULSE−=VPULSE_Orig FIG. 4 is an illustration of the first and second signal generated by controller 310. Line 410 illustrates an electrical ground relative to the first and second signal. The first signal may be illustrated by line 430 and the second signal may be illustrated by line 440. The first signal 430 may be offset from the ground by a DC bias illustrated by line 420. The first line 430 may be synchronized with the second line 440. Further, the first line 430 may be symmetric with line 440. Further, the slope and/or polarity of the first signal may be opposite of the second signal. In addition, the combination of the first signal and the second signal may generate a wave form in close approximation to the sync signal 220 from FIG. 2.

Figure 5:
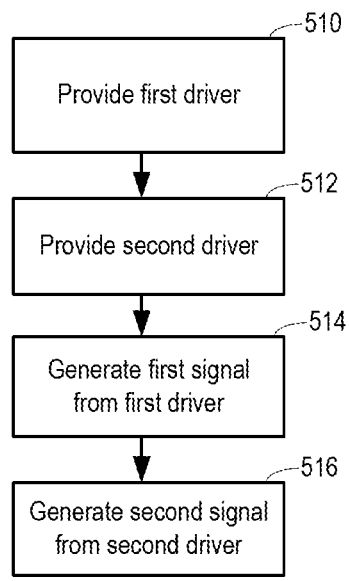
FIG. 5 is a block diagram of an implementation.

FIG. 5 is a method for generating a sync pulse for a sensor. The method begins in step 510. In step 510, a first sync pulse driver is provided. In step 512, a second sync pulse driver is provided. In step 514, the first sync pulse driver generates a first signal on a first line. In step 516, the second sync pulse generates a second signal on a second line. The first and second signal form a differential sync pulse signal between the first and second line. Further, the first and/or second signal may float relative to ground. The first and/or second signal may be direct current (DC) biased.

The first line and the second line may be a wire twisted pair. The first line and the second line may have a balanced output impedance. Additionally, first signal may be symmetrical with the second signal. The first signal may have the same rise and/or fall times as the second signal. The first signal is has the opposite polarity as the second signal. The first signal has positive initial slope and negative second slope and the second signal has negative initial slope and positive second slope. The first signal and second signal sum to generate a combined pulse signal that matches PSI5 specifications.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

As a person skilled in the art will readily appreciate, the above description is meant as an illustration of the principles of this disclosure. This description is not intended to limit the scope or application of this disclosure in that the systems and methods are susceptible to modification, variation and change, without departing from spirit of this disclosure, as defined in the following claims.

The invention claimed is:

1. A restraint control module configured to communicate a sync pulse to a sensor having PSI5 timing compliance, the module comprising:
   a first sync pulse driver connected to a first signal line; and
   a second sync pulse driver connected to a second signal line, the first and second sync pulse drivers are synchronized to generate a first signal on the first signal line and second signal on the second signal line that form a single sync pulse across the first signal line and second signal line.

2. The restraint control module according to claim 1, wherein the first signal and second signal form a differential signal that floats relative to ground.

3. The restraint control module according to claim 2, wherein the first signal and second signal are direct current (DC) biased.

4. The restraint control module according to claim 3, wherein the first signal is symmetrical with the second signal.

5. A method for communicating a sync pulse to a sensor, the method comprising:
   providing a first driver;
   providing a second driver;
   generating a first signal with the first driver; and generating a second signal with the second driver, wherein the first and second signal combine to generate an effective sync pulse according to PSI5 specifications.

6. The method according to claim 5, wherein the first signal has positive initial slope and negative second slope; and wherein the second signal has negative initial slope and positive second slope that are symmetrical with the first signal.

7. A system for a restraint control module configured to communicate a sync pulse to a sensor, the system comprising:
    a first sync pulse driver connected to a first signal line; and
    a second sync pulse driver connected to a second signal line, the first and second sync pulse drivers being configured to generate a differential sync pulse signal across the first signal line and second signal line, using a first signal on the first signal line and a second signal on the second signal line;
    wherein first signal and second signal sum to generate a combined pulse signal that matches PSI5 specifications.

8. The system according to claim 7, wherein the first signal is floating relative to ground.

9. The system according to claim 8, wherein the second signal is floating relative to ground.

10. The system according to claim 7, wherein the first signal is direct current (DC) biased.

11. The system according to claim 10, wherein the second signal is DC biased.

12. The system according to claim 7, wherein the first line and the second line are a wire twisted pair.

13. The system according to claim 7, wherein the first line and the second line have a balanced output impedance.

14. The system according to claim 7, wherein the first signal is symmetrical with the second signal.

15. The system according to claim 7, wherein the first signal has a same rise time as the second signal.

16. The system according to claim 7, wherein the first signal has a same fall time as the second signal.

17. The system according to claim 7, wherein the first signal has an opposite polarity as the second signal.

18. The system according to claim 7, wherein the first signal has positive initial slope and negative second slope.

19. The system according to claim 7, wherein the second signal has negative initial slope and positive second slope.

* * * * *